United States Patent [19]

Akai et al.

[11] Patent Number: 4,622,069

[45] Date of Patent: Nov. 11, 1986

[54] CATALYST COMPOSITION FOR FORMING ELECTROLESS PLATING ON CERAMICS

[75] Inventors: Yoshito Akai, Naga; Nobuyuki Konaga, Osaka; Yasunori Arisato, Katano; Masatoshi Wada, Kishiwada; Yukikazu Moritsu, Nishinomiya, all of Japan

[73] Assignee: Okuno Chemical Industry Co., Ltd., Osaka, Japan

[21] Appl. No.: 803,290

[22] PCT Filed: Mar. 14, 1985

[86] PCT No.: PCT/JP85/00128

§ 371 Date: Nov. 15, 1985

§ 102(e) Date: Nov. 15, 1985

[30] Foreign Application Priority Data

Mar. 16, 1984 [JP] Japan ................................ 59-51353

[51] Int. Cl.$^4$ .............................................. C23C 3/02
[52] U.S. Cl. ............................ 106/1.11; 106/193 R; 427/229; 427/305; 524/204; 524/398; 524/399
[58] Field of Search ................... 106/1.11, 193 R; 427/229, 305; 524/204, 398, 399

[56] References Cited

U.S. PATENT DOCUMENTS

| | | | |
|---|---|---|---|
| 4,150,995 | 4/1979 | Moritsu et al. | 106/1.21 |
| 4,248,632 | 2/1981 | Ehrich et al. | 106/1.11 |
| 4,262,040 | 4/1981 | Russo | 106/1.14 |
| 4,418,099 | 11/1983 | Cuevas et al. | 427/229 |

Primary Examiner—Lorenzo B. Hayes
Attorney, Agent, or Firm—Armstrong, Nikaido, Marmelstein & Kubovcik

[57] ABSTRACT

A composition for forming electroless plating on ceramics which comprises (i) 1 weight part of at least one member selected from the group consisting of organic palladium compounds and organic silver compounds, (ii) 0.1 to 200 weight parts of at least one member selected from the group consisting of organic metal compounds, (iii) 10 to 1000 weight parts of an organic solvent and optionally (iv) 1 to 500 weight parts of at least one member selected from the group consisting of high molecular compounds and particulate inorganic substances.

12 Claims, No Drawings

CATALYST COMPOSITION FOR FORMING ELECTROLESS PLATING ON CERAMICS

TECHNICAL FIELD

This invention relates to catalyst compositions for forming electroless plating on ceramics and more particularly to a composition for depositing a catalyst metal of a ceramic substrate prior to formation of a metallic layer of copper or nickel on said substrate.

BACKGROUND ART

The technology of forming a metallic conductive layer on a ceramic surface has been employed widely in the manufacture of electronic parts and other articles. One of such methods is the method known as electroless plating. As ceramics are not receptive to electroless plating baths, it is necessary that the surface of a ceramic substrate be previously treated with a catalyst metal such as palladium, silver or the like prior to the formation of a metallic layer by electroless plating. The methods heretofore known for applying a catalyst metal to the substrate surface include (a) the process which comprises dipping a ceramic substrate in a solution of the catalyst metal in acidic aqueous medium, (b) a process in which the ceramic substrate is treated with a bath prepared by dissolving or dispersing a catalyst metal compound in an organic medium by a suitable technique such as dipping, brushing or spraying and the substrate so treated is then heated, and (c) a process in which a composition prepared by dissolving or dispersing the catalyst metal compound in an organic or other vehicle is printed on the substrate and the printed substrate is then heated. However, these known methods for catalyst metal pretreatment have at least one of the following disadvantages that must be overcome.

(a) The process is costly because the expensive catalyst metal compound must be provided in high concentration.

(b) The composition containing the catalyst metal compound has a poor storage stability.

(c) The deposition and adhesive characteristics of the electroless plating metal applied after application of the catalyst metal with respect to the ceramic substrate are not fully satisfactory.

(d) There is a serious limitation to the type of ceramic materials that can be treated.

(e) When the catalyst metal is applied to the ceramic substrate by screen printing, partial dipping or the like, the dimensional accuracy of the metal plating layer is sacrificed.

DISCLOSURE OF THE INVENTION

We conducted a series of experiments and studies in regard to the method for applying a catalyst metal to a ceramic substrate prior to electroless plating and found that the use of a composition comprising a specific palladium and/or silver compound and a specific organic metal compound results in a substantial elimination or a marked alleviation of the problems inevitable with the conventional methods. Thus, this invention provides the following composition (hereinafter referred to as Invention I).

(1) A catalyst composition for forming electroless plating on ceramics which comprises:
 (i) 1 weight part of at least one member of the group consisting of
  (a) organic palladium compounds of the general formulas:

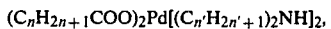

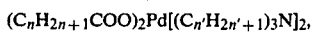

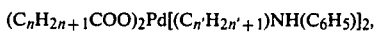

$(C_nH_{2n+1}COO)_2Pd[(C_6H_5)_2NH]_2$ and

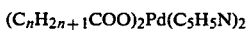

[wherein n and n', respectively, mean an integer of 1 to 7] and
  (b) organic silver compounds of the general formulas:

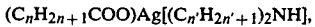

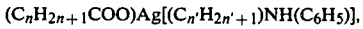

$(C_nH_{2n+1}COO)Ag[(C_6H_5)_2NH]$ and

[wherein n and n', respectively, mean an integer of 1 to 7],
 (ii) 0.1 to 200 weight parts of at least one member of the group consisting of organic metal compounds of the general formulas:

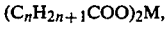

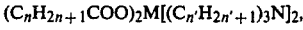

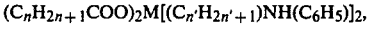

$(C_nH_{2n+1}COO)_2M[(C_6H_5)_2NH]_2$,

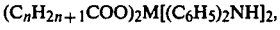

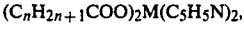

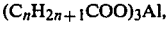

$(C_{n''}H_{2n''+1}O)_3Al$ and $C_6H_9O_3Al(OC_{n''}H_{2n''+1})_2$

[wherein n is equal to 0 or an integer of 1 to 18, n' is an integer of 1 to 18, and n" is an integer of 2 to 4; M is copper, nickel, iron, aluminum, zinc or tin] and
 (iii) 10 to 1000 weight parts of an organic solvent.

Our studies further revealed that incorporation of a high molecular compound and/or a particulate inorganic substance in the composition of invention I results in a further improvement in adhesion or adhesive affinity between the ceramic substrate and metal plating layer. Thus, this invention provides also the following composition (hereinafter referred to as Invention II).

(2) A catalyst composition for forming electroless plating on ceramics which comprises:
 (i) 1 weight part of at least one member selected from the group consisting of
  (a) organic palladium compounds of the general formulas:

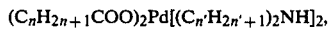

$(C_nH_{2n+1}COO)_2Pd[(C_{n'}H_{2n'+1})_3N]_2$, $(C_nH_{2n+1}COO)_2Pd[(C_{n'}H_{2n'+1})NH(C_6H_5)]_2$, $(C_nH_{2n+1}COO)_2Pd[(C_6H_5)_2NH]_2$ and $(C_nH_{2n+1}COO)_2Pd(C_5H_5N)_2$

[wherein n and n', respectively, mean an integer of 1 to 7] and (b) organic silver compounds of the general formulas:

$(C_nH_{2n+1}COO)Ag[(C_{n'}H_{2n'+1})_2NH]$, $(C_nH_{2n+1}COO)Ag[(C_{n'}H_{2n'+1})_3N]$, $(C_nH_{2n+1}COO)Ag[(C_{n'}H_{2n'+1})NH(C_6H_5)]$, $(C_nH_{2n+1}COO)Ag[(C_6H_5)_2NH]$ and $(C_nH_{2n+1}COO)Ag(C_5H_5N)$

[wherein n and n', respectively, mean an integer of 1 to 7], (ii) 0.1 to 200 weight parts of at least one member selected from the group consisting of organic metal compounds of the general formulas:

$(C_nH_{2n+1}COO)_2M$, $(C_nH_{2n+1}COO)_2M[(C_{n'}H_{2n'+1})_2NH]_2$, $(C_nH_{2n+1}COO)_2M[(C_{n'}H_{2n'+1})_3N]_2$, $(C_nH_{2n+1}COO)_2M[(C_{n'}H_{2n'+1})NH(C_6H_5)]_2$, $(C_nH_{2n+1}COO)_2M[(C_6H_5)_2NH]_2$, $(C_nH_{2n+1}COO)_2M(C_5H_5N)_2$, $(C_nH_{2n+1}COO)_3Al$, $(C_{n''}H_{2n''+1}O)_3Al$ and $C_6H_9O_3Al\ (OC_{n''}H_{2n''+1})_2$

[wherein n is equal to 0 or an integer of 1 to 18, n' is an integer of 1 to 18, n'' is an integer of 2 to 4, and M denotes copper, nickel, iron, aluminum, zinc or tin], (iii) 10 to 1000 weight parts of an organic solvent, and (iv) 1 to 500 weight parts of at least one member of the group consisting of high molecular compounds and particulate inorganic substances.

The respective components of the composition according to this invention will hereinafter be described in detail.

(1) The organic palladium and organic silver compounds employed in this invention are the compounds each obtainable by a coordination reaction between an aliphatic or aromatic secondary or tertiary amine compound and the palladium or silver compound of an aliphatic monocarboxylic acid. The aliphatic carboxylic acid that may form a compound with palladium or silver is preferably an aliphatic monocarboxylic acid of 1 to 7 carbon atoms, such as acetic acid, propionic acid, butyric acid, valeric acid, caproic acid, enanthic acid, caprylic acid, etc., in view of the solubility or dispersibility of the compound in organic solvents and the long-term stability of the final composition. The palladium and silver compounds of aliphatic monocarboxylic acids of more than 7 carbon atoms, hydoxycarboxylic acids, dicarboxylic acids, etc. are not usable, for these compounds are not highly-soluble or dispersible in organic solvents, nor are they stable enough in the final composition. Secondary or tertiary amine compounds to be coordinated with such aliphatic monocarboxylic acid palladium or silver compounds include dimethylamine, diethylamine, triethylamine, di-n-propylamine, diisopropylamine, dibutylamine, trimethylamine, triethylamine, tripropylamine, tributylamine, pyridine, phenylethylamine, phenyldipropylamine, diphenylamine, etc. The aliphatic monocarboxylic acid palladium or silver compounds coordinated with primary amine compounds are not satisfactory in solubility or dispersibility as well as in stability, while the palladium or silver compounds coordinated with lower amines of less than 2 carbon atoms are not easy to synthesize. The use of higher amines containing a large number of carbon atoms are also unsatisfactory in that they are not well soluble or dispersible.

The general formulas and specific examples of such organic palladium compounds and organic silver compounds are as follows:

(a) Organic palladium compounds represented by the general formulas:

$(C_nH_{2n+1}COO)_2Pd[(C_{n'}H_{2n'+1})_2NH]_2$, $(C_nH_{2n+1}COO)_2Pd[(C_{n'}H_{2n'+1})_3N]_2$, $(C_nH_{2n+1}COO)_2Pd[(C_{n'}H_{2n'+1})NH(C_6H_5)]_2$, $(C_nH_{2n+1}COO)_2Pd[(C_6H_5)_2NH]_2$ and $(C_nH_{2n+1}COO)_2Pd(C_5H_5N)_2$

[wherein n and n', respectively, mean an integer of 1 to 7].

Preferred organic palladium compounds are:

$(CH_3COO)_2Pd[(C_2H_5)_2NH]_2$, $(CH_3COO)_2Pd[(C_3H_7)_2NH]_2$, $(CH_3COO)_2Pd[(C_4H_9)_3N]_2$, $(CH_3COO)_2Pd[(C_6H_5)NH(C_2H_5)]_2$, $(C_2H_5COO)_2Pd[(C_2H_5)_3N]_2$, $(C_4H_9COO)_2Pd(C_5H_5N)_2$, $(C_5H_{11}COO)_2Pd[(C_4H_9)_2NH]_2$ and $(C_7H_{15}COO)_2Pd[(C_2H_5)_3N]_2$, etc.

(b) Organic silver compounds represented by the general formulas:

$(C_nH_{2n+1}COO)Ag[(C_{n'}H_{2n'+1})_2NH]$, $(C_nH_{2n+1}COO)Ag[(C_{n'}H_{2n'+1})_3N]$, $(C_nH_{2n+1}COO)Ag[(C_{n'}H_{2n'+1})NH(C_6H_5)]$, $(C_nH_{2n+1}COO)Ag[(C_6H_5)_2NH]$ and $(C_nH_{2n+1}COO)Ag(C_5H_5N)$

[wherein n and n', respectively, mean an integer of 1 to 7].

Preferred organic silver compounds are:

$(CH_3COO)Ag[(C_2H_5)_2NH]$, $(CH_3COO)Ag[(C_4H_9)_2NH]$, $(CH_3COO)Ag(C_5H_5N)$, $(CH_3COO)Ag[(C_2H_5)_3N]$, $(C_2H_5COO)Ag[(C_3H_7)_2NH]$ $(C_3H_7COO)Ag[(C_4H_9)_3N]$, $(C_6H_{13}COO)Ag[(C_6H_5)NH(C_3H_7)]$ and $(C_7H_{15}COO)Ag[(C_6H_5)_2NH]$, etc.

(2) The organic metal compound of copper, nickel, iron, aluminum, zinc or tin which is used in combination with the above-described organic palladium and/or organic silver compound is preferably selected from among metal salts of aliphatic monocarboxylic acids, coordination compounds between such a metal salt and a secondary or tertiary amine compound, and alcoholates and chelate compounds of aluminum. The aliphatic monocarboxylic acids which are to form the salts with copper and other metals are exemplified by the compounds of general formula $C_nH_{2n+1}COOH$ (n=0 to 18) and the salts are exemplified by nickel formate, copper formate, nickel acetate, copper acetate, zinc acetate, iron acetate, tin acetate, aluminum acetate, copper propionate, nickel propionate, iron propionate, aluminum propionate, zinc propionate, tin propionate, copper butyrate, nickel butyrate, iron butyrate, aluminum butyrate, zinc butyrate, tin butyrate, copper valerate, nickel valerate, iron valerate, aluminum valerate, zinc valerate, tin valerate, copper caproate, nickel caproate, iron caproate, aluminum caproate, zinc caproate, tin caproate, copper caprylate, nickel caprylate, iron caprylate, aluminum caprylate, zinc caprylate, tin caprylate, copper palmitate, nickel palmitate, iron palmitate, aluminum palmitate, zinc palmitate, tin palmitate, copper stearate, nickel stearate, iron stearate, aluminum stearate, zinc stearate, tin stearate, etc. Secondary or tertiary amine compound to be coordinated with the metal aliphatic monocarboxylates include dimethylamine, diethylamine, triethylamine, di-n-propylamine, diisopropylamine, tripropylamine, dibutylamine, tributylamine, pyridine, phenylethylamine, phenyldipropylamine, diphenylamine, etc.

The organic metal compounds such as those of copper may be shown below by general formulas.

$(C_nH_{2n+1}COO)_2M$, $(C_nH_{2n+1}COO)_2M[(C_{n'}H_{2n'+1})_2NH]_2$, $(C_nH_{2n+1}COO)_2M[(C_{n'}H_{2n'+1}COO)_3N]_2$, $(C_nH_{2n+1}COO)_2M[(C_{n'}H_{2n'+1})NH(C_6H_5)]_2$, $(C_nH_{2n+1}COO)_2M[(C_6H_5)_2NH]_2$, $(C_nH_{2n+1}COO)_2M(C_5H_5N)_2$, $(C_{n''}H_{2n''+1}O)_3Al$, $C_6H_9O_3Al(OC_{n''}H_{2n''+1})_2$, $(C_nH_{2n+1}COO)_3Al$

[wherein n is equal to 0 or an integer of 1 to 18, n' is an integer of 1 to 18, n" is an integer of 2 to 4; M is copper, nickel, iron, aluminum, zinc or tin]

Specific examples of the organic metal compounds having the above general formulas are as follows.

$(HCOO)_2Cu[(C_2H_5)_2NH]_2$, $(C_6H_{13}COO)_2Cu[(C_6H_5)_2NH]_2$, $(CH_3COO)_2Ni[(C_3H_7)_3N]_2$, $(C_5H_{11}COO)_2Ni[(C_5H_{11})_2NH]_2$, $(C_2H_5COO)_2Fe[(C_2H_5)_3N]_2$, $(C_{12}H_{25}COO)_2Fe[(C_4H_9)_2NH]_2$, $(C_{15}H_{31}COO)_2Al[(C_3H_7)_2NH]_2$, $(C_{18}H_{37}COO)_2Al[(C_2H_5)NH(C_6H_5)]$, $(C_3H_7COO)_2Zn[(C_4H_9)_3N]_2$, $(C_{10}H_{21}COO)_2Zn[(C_7H_{15})_2NH]_2$, $(C_4H_9COO)_2Sn[(C_5H_{11})_3N]_2$, $(C_9H_{19}COO)_2Sn[(C_4H_9NH(C_6H_5)]_2$, $(C_3H_7COO)_2Sn(C_5H_5N)_2$, aluminum isopropylate, aluminum butylate, monobutoxyaluminum diisopropylate, ethyl acetoacetate-aluminum diisopropylate, etc.

These organic metal compounds are used in a proportion of about 0.1 to 200 weight parts per 1 weight part of the aforementioned organic silver compound and/or organic palladium compound. If the proportion is less than 0.1 weight part, the effect of combination of these 2 types of organic metal compounds is not fully achieved, while if it is over 200 weight parts, it is uneconomical and, in addition, the adhesion of electroless platings to ceramic substrates is lowered.

(3) Organic solvents to be used in this invention is not particularly limited insofar as the organic silver or/and organic palladium compound and the organic copper or other metal compounds can be easily dissolved or dispersed therein. Thus, a variety of known solvents that have heretofore been commonly employed in the formulation of printing ink, paints, pastes, etc. can be utilized. Preferred examples of such organic solvent include various hydrocarbons such as cyclohexane, benzene, toluene, xylene, etc.; chlorine-containing solvents such as 1,1,1-trichloroethane, carbon tetrachloride, epichlorohydrin, monochlorobenzene, etc.; alcohols such as methanol, ethanol, isopropyl alcohol, n-butanol, n-hexanol, ethylene glycol, diethylene glycol, glycerin, etc.; polymeric alcohols such as polyethylene glycol, etc.; nitriles such as acetonitrile, etc.; amines such as triethylamine, isopropylamine, aniline, monoethanolamine, triethanolamine, etc.; ketones such as acetone, methyl ethyl ketone, methyl n-butyl ketone, cyclohexanone, etc.; ethers such as isopropyl ether, ethylcellosolve, butylcellosolve, butylcarbitol, dioxane, etc.; esters such as ethyl acetate, butyl acetate, ethyl acetoacetate, ethylcellosolve acetate, butylcellosolve acetate, butylcarbitol acetate, etc.; naturally-occurring substances such as pine oil, terpineol, balsam oil, etc.

The amount of such solvent is not limited, but is preferably 10 to 1000 weight parts per 1 part of said organic silver and/or organic palladium compound.

(4) In the composition according to Invention II, a high molecular compound and/or a particulate inorganic substance is incorporated.

The high molecular weight compound is a component useful for depositing a catalyst metal in a definite pattern on the ceramic substrate by, for example, screen printing. Examples of such high molecular weight compound are polyacrylates such as polymethyl methacrylate, polybutyl methacrylate, etc.; cellulose derivatives such as ethylcellulose, butylcellulose, nitrocellulose, cellulose acetate, etc.; and other thermoplastic resins such as polybutadiene, polystyrene, polyethylene, polypropylene, polyvinyl acetate, polyvinyl chloride, acrylonitrile-styrene copolymer, etc.

When a particulate inorganic substance is incorporated in the composition, baking the ceramic substrate coated with the composition results in a fused deposition of the particles on the substrate to provide the surface of the substrate with an almost countless number of projections and/or indentations. As the electroless plating layer is then formed through an interposed layer of catalyst metal on this roughened surface, the adhesion of plating metal to the substrate is further improved by a mechanical anchor effect. The particulate inorganic substance is exemplified by metal oxides such as $SiO_2$, $PbO$, $B_2O_3$, $Al_2O_3$, $CaO$, $BaO$, $MgO$, $BeO$, $TiO_2$, $ZrO_2$, $SnO_2$, $Na_2O$, $Li_2O$. etc.; metal fluoride such as $PbF_2$, $SnF_2$, $CaF_2$, etc.; silicates such as talc, cordierite, kaolin, magnesium silicate, aluminum silicate, calcium silicate, etc.; metal carbides such as silicon carbide, boron carbide, etc.; metal nitrides such as boron nitride, titanium nitride, etc.; and titanates such as barium titanate, lead titanate, etc. The substance is used singly or as a mixture of two or more species, and may also be used for example in the form of a glass enamel composition. The particle size of such particulate inorganic substances is preferably in the range of about 1 to 10 μm.

The preferred proportion of said high molecular compound and/or particulate inorganic substance is 1 to 500 weight parts per one weight part of the organic silver and/or organic palladium compound.

The catalyst composition of this invention can be easily prepared by mixing either (i) an organic palladium compound and/or organic silver compound, (ii) an organic compound of copper or the like, and (iii) an organic solvent (Invention I) or (i), (ii) and (iii) and (iv) a high molecular compound and/or an inorganic compound (Invention II) and stirring the mixture so that either (i) and (ii) or (i), (ii) and (iv) are uniformly dissolved or dispersed in (iii).

For forming the electroless plating on the ceramic substrate, the catalyst composition of this invention is first applied to the substrate by a suitable method such as dipping, brushing, dispenser dripping, screen-printing, spray coating, transfer printing, etc. Then, the ceramic substrate is dried or fired in the air at a temperature of about 130° to 1600° C. for 5 to 60 minutes, whereby the organic palladium compound and/or organic silver compound and the organic compound of copper or the like are decomposed to yield dot-like deposits of finely divided palladium and/or silver and copper or other metal, or oxides thereof on the surface of the ceramic substrate. In this process, the organic solvent and high molecular compound (Invention II) are vaporized or pyrolyzed and dissipated into the atmosphere while the particulate inorganic substance (Invention II) remains on the surface of the ceramic substrate. It should be understood that when such a particulate inorganic substance is used, the heat-treatment is preferably carried out within the range of a temperature lower or higher by about 30° C. than the softening point (generally 500° C. or higher) of the inorganic substance so that the inorganic particles can be fused to the ceramic substrate to a sufficient extent. After the temperature of the heated ceramic substrate has become about 50° C. or less, the substrate is dipped in the electroless plating bath to cause the plating metal to deposit thereon. If the deposition of electroless plating is insufficient owing to such factors as the composition of the ceramic substrate, heat-treating temperature, amount of deposition of catalyst metals, plating conditions, etc., the drawback of insufficient metal deposition can be overcome by dipping the plated ceramic substrate at about 50° C. or less into a dilute solution of mineral acid such as hydrochloric acid, sulfuric acid, hydrofluoric acid or the like, rinsing it and, then, dipping it again in the electroless plating bath. The electroless plating bath may be a known copper or nickel plating bath. For example, the copper plating bath may be any electroless copper plating bath using a known reducing agent such as formaldehyde, dimethylaminoborane, sodium borohydride or the like. Preferred examples of solutions are those commercially available under the trade names of "TMP Chemical Copper #500", "OPC-700", "OPC Copper", "Copper LP", and "Copper FL" (all from Okuno Chemical Industries Co., Ltd.). The nickel plating bath includes electroless nickel plating baths using known reducing agents such as sodium hypophosphite, dimethylaminoborane, etc. Examples of commercially available products include "Topcolone N-47", "Topcolone TR", "Topnicolone EL-70X", "TMP Chemical Nickel", "Niclad 40" and "Niclad 741" (all from Okuno Chemical Industries Co., Ltd.).

The ceramic substrate with a copper or nickel plating formed thereon in the above manner may, as necessary, be further subjected to electroplating and/or electroless plating for forming an additional plating, such as a copper, nickel, tin, pewter, silver or gold plating, to give a multilayer plating.

The ceramic substrate to be subjected to electroless plating following the treatment with the catalyst composition according to the invention includes, but is not particularly limited to, sintered moldings of oxides, nitrides, carbides, and borides and, more specifically, oxide ceramics such as alumina, mullite, zirconia, beryllia, forsterite, steatite and ferrite; titanate ceramics such as barium titanate, strontium titanate, lead titanate and lead titanate zirconate; nitride ceramics such as boron nitride, silicon nitride and titanium nitride; carbide ceramics such as silicon carbide; and boride ceramics such as titanium boride.

The process which comprises providing ceramic substrates with a catalyst metal using the composition according to the invention and then forming a desired plating layer is very useful in the formation of electrodes for condensers, piezoelectric ceramics and ceramic sensors, in the production of ceramic resistors and ceramic heating elements, and in the formation of conductor circuits on ceramic substrates and enameled substrates, etc.

EFFECTS OF THE INVENTION (1) The catalyst composition according to the invention has very good storage stability. Thus, even after 3-month storage, the composition does not show any substantial phase separation or precipitation. When applied to ceramic substrates, it does not cause decrease in the ability of plating metals to deposit or in the adhesion thereof at all.

(2) Since the composition according to the invention contains, in a highly penetrating organic solvent, other components in a very favorably dissolved or dispersed state, the catalyst metal compounds, together with the organic solvent, can evenly reach or penetrate not only smooth portions of ceramic substrates but also fine indentations or small openings thereon. Therefore, in forming electroless plating, metals can deposit uniformly even on such uneven portions and small openings, so that the ceramic-to-metal layer adhesion resulting from the anchoring effect becomes firm and stable and the ununiformity in plating metal deposition among different sites on one and the same product article as well as the variation in plating metal deposition among a plurality of mass-produced product articles are also greatly reduced.

(3) While having good storage stability, the composition according to the invention, when heated following application to ceramic substrates, can easily disperse at temperatures within the broad range of 130°–1,600° C. to give metallic palladium or silver and thereby produce excellent catalytic effect.

(4) The organic copper and other metal compounds used in combination with the organic palladium compound and/or organic silver compound, when heated on ceramic substrates, give fine particles of metallic copper and other metals or metal oxides. Although these metal particles or those metal particles which are formed from metal oxides under the action of the reducing agent contained in the electroless plating solution, as such, have no substantial catalytic activity, they can produce a particular effect of markedly increasing the catalytic activity of the catalyst metal, namely palladium and/or silver, when they coexist with said catalyst metal. The mechanism by which such particular effect is produced has not yet fully elucidated but may presumably be as follows: Heating of the organic palladium or silver compound leads to decomposition thereof and simultaneous formation of minute metal particles and a small quantity of minute metal oxide particles. The latter particles inhibit the catalytic effect of the former. It is not easy for the catalyst metal oxide to be converted to the corresponding metal even in contact with an acid or the reducing agent contained in the electroless plating solution. When the organic palladium and/or silver compound is used conjointly with the organic copper and/or some other metal compound or compounds, however, the palladium and/or silver oxide formation is significantly inhibited, so that the inhibition of the catalytic activity of minute metallic palladium and/or silver particles is much reduced.

(5) Since the catalyst activity of palladium and/or silver is increased significantly, the quantity of the catalyst metal compound, which is expensive, can be reduced up to about 50%. As a result, the cost of production of ceramic products can be reduced.

(6) It is also possible to very easily cause deposition of electroless platings on those ceramics on which such electroless platings have so far been very difficult to deposit, for example lead-containing ceramics such as lead titanate and lead titanate zirconate or bismuth-containing ceramics.

(7) In plating ceramic articles in the prior art, after ceramic materials are mixed, ground and shaped, the shaped articles are preliminarily fired at a low temperature, then subjected to firing at a higher temperature and, after coating with a composition containing a catalyst metal compound, fired at about 200°–800° C., followed by electroless plating. In that case, the temperature for firing the ceramic subtrate after coating with the catalyst composition has an upper limit of about 800° C. The limitation is required to inhibit the oxidation of the catalyst metal and thereby preventing the reduction of catalytic effect in electroless plating caused by the presence of oxide. On the contrary, when the catalyst composition according to the invention which contains the organic palladium compound and/or organic silver compound in combination with a copper and/or other organic metal compound or compounds is used, the presence of copper and/or other metal or metals used additionally favorably inhibits the oxidation of the catalyst metal, so that the firing following coating of the ceramic substrate with the catalyst composition can be performed even at higher temperatures up to about 1,600° C. It is therefore possible to mold a ceramic material, provisionally fire the moldings, coat them directly thereafter with the catalyst composition, fire them at about 800°–1,600° C. and conduct electroless plating. It is thus possible to omit the step of firing at a high temperature of the moldings prior to coating with the catalyst composition.

(8) The presence of at least one of copper, nickel, iron, aluminum, zinc and tin as contained in the catalyst composition according to the invention also serves to increase the adhesion of the plating metal layer to the ceramic substrate. This is supposedly due to the formation of chemical bonds (metal bonds) between the plating metal layer and ceramic substrate with the intermediation of copper and/or other metal or metals. The formation of such bonds reinforce the adhesion based on the above-mentioned anchoring effect.

(9) For forming a specific electroless plating pattern on ceramic materials, the catalyst composition is screen-printed only on those sites or places on the ceramic materials on which platings are to be formed. On that occasion, the precision of printing with the catalyst composition is usually essential for the precision of pattern plating. Therefore, to prevent the catalyst composition from going out of fine pattern details, the thixotropic characteristics of the composition are improved by increasing the content of a highly viscous organic vehicle or a glass enamel, etc. In this case, the precision of printing is indeed improved, but the viscosity of the composition is markedly increased, unavoidably leading to decrease in printability. On the contrary, the composition according to the invention has much improved thixotropic characteristics, in spite of a slight viscosity increase, as a result of the combined use of an organic copper compound and/or other organic metal compound or compounds and thus the composition enables precise printing and at the same time has good printability.

BEST MODES FOR CARRYING OUT THE INVENTION

The following examples further illustrate the characteristic features of the present invention. In the following, "part(s)" and "%" mean "part(s) by weight" and "% by weight", respectively.

EXAMPLE 1

In a solvent mixture of 44.8 parts of acetone and 50 parts of butyl acetate were dissolved or dispersed 0.25 part of $(CH_3COO)_3Pd[(C_2H_5)_2NH]_2$ and 5 parts of nickel acetate to give a catalyst composition of this invention. Then, 100 pieces ($3\times3\times0.5$ mm$^3$) of 96% alumina ceramic were immersed in the composition at 20° C. for 5 minutes and, then, heated at 150° C. for 10 minutes. After cooling, the alumina ceramic pieces were plated in an electroless nickel plating bath (A) at 90° C. for 10 minutes.

Table 1 shows the composition of electroless nickel plating bath (A) and those of the plating baths used in the other examples and reference examples. Table 2 shows the storage stability of the catalyst compositions and the chracteristics of the electroless plates obtained using the compositions in the examples and reference examples.

EXAMPLE 2

In 96.6 parts of toluene were dissolved or dispersed 0.4 part of $(C_2H_5COO)Ag(C_5H_5N)$ and 3 parts of $(CH_3COO)_2Cu[(C_3H_7)_2NH]_2$. Sintered silicon nitride bodies (20 mm $\times$ 20 mm $\times$ 10 mm) were immersed in the above-obtained catalyst composition of this invention at 25° C. for 3 minutes and, then, heated at 200° C. for 15 minutes. After cooling, the sintered bodies were plated in an electroless copper plating bath (B) at 55° C. for 20 minutes.

EXAMPLE 3

In a vehicle consisting of 15 parts of ethylcellulose and 79.9 parts of butylcarbitol acetate were dissolved or dispersed 1 part of $(C_4H_9COO)_2Pd[(C_2H_5)_3N]_2$ and 4 parts of tin stearate to give a catalyst composition of this invention. Using a 300-mesh screen, the above catalyst composition was screen-printed in 3 linear patterns each measuring 150 μm wide and 40 mm long on one side of a 96 % alumina ceramic plate (50 mm $\times$ 50 mm $\times$ 0.65 mm). The printed ceramic plate was dried at 150° C. for 10 minutes and fired at 500° C. for 10 minutes. After cooling the alumina ceramic plate, it was plated in the electroless nickel plating bath (A) at 77° C. for 10 minutes.

EXAMPLE 4

In a vehicle consisting of 10 parts of polymethyl methacrylate, 39 parts of ethylcellosolve and 40 parts of ethyl acetoacetate were dissolved or dispersed 0.5 part of $(CH_3COO)_2Pd[(C_6H_5)NH(C_2H_5)]_2$, 0.5 part of $(CH_3COO)_2Ag [(C_6H_5)_2NH]$, 5 parts of copper propionate and 5 parts of iron acetate. Using a 200-mesh screen, the above catalyst composition was screen-printed on the whole surface of one side of a 98% alumina ceramic plate (50 mm $\times$ 50 mm $\times$ 0.65 mm). The printed ceramic plate was dried at 170° C. for 10 minutes and fired at 450° C. for 13 minutes. After cooling the alumina ceramic plate, it was plated in an electroless copper plating bath (C) at 37° C. for 20 minutes.

EXAMPLE 5

In 95 parts of polyethylene glycol were dissolved solved or dispersed 2 parts of $(C_5H_{11}COO)_2Pd[(C_3H_7)_2NH]_2$, 1 part of zinc stearate and 2 parts of $(C_3H_7COO)_2Fe [(C_2H_5)_3N]$ to give a catalyst composition of this invention. Then, 2 mg of the above composition was dripped with dispenser into a recess (length 4 mm $\times$ width 4 mm $\times$ depth 2 mm) formed in the center of a sintered ferrite plate (10 mm $\times$ 10 mm $\times$ 5 mm) and the plate was then fired at 400° C. for 8 minutes. The sintered plate was cooled and plated in an electroless nickel plating bath (D) at 85° C. for 14 minutes.

EXAMPLE 6

In 89 parts of balsam oil were dissolved or dispersed 10 parts of $(C_2H_5COO)_2Pd[(C_4H_9)_2NH]_2$ and 1 part of aluminum isopropylate. The resultant composition was transfer-printed in a circle with a diameter of 10 mm on both sides of a sintered barium titanate disk (15 mm in diameter and 0.1 mm in thickness) and fired at 590° C. for 18 minutes. After cooling, the sintered disk was immersed and plated in the electroless plating bath (A) at 90° C. for 5 minutes.

EXAMPLE 7

In a solvent mixture of 11 parts of butylcellulose, 22 parts of methyl ethyl ketone and 26 parts of pine oil were dissolved or dispersed 5 parts of $(CH_3COO)_2Pd[(C_2H_5)_3N]_2$, 12 parts of $(C_5H_{11}COO)_2Cu [(C_4H_9)_3N]_2$ and 20 parts of glass enamel ($SiO_2$ 50%, $B_2O_3$ 15%, PbO 15%, $Na_2O$ 5%, $Li_2O$ 3%, $ZrO_2$ 4%, $Al_2O_3$ 3%, CaF 4% and $TiO_2$ 1%) to give a catalyst composition. Using a 250-mesh screen, the composition was screen-printed in a rectangular pattern of 18 mm $\times$ 8 mm on both side of a sintered lead titanate zirconate plate (20 mm $\times$ 10 mm $\times$ 0.3 mm). The plate was dried at 150° C. for 5 minutes and, then, fired at 620° C. for 20 minutes. After cooling, the sintered plate was immersed in a 5 volume % aqueous solution of hydrochloric acid at 20° C. for 20 seconds, washed with water and plated in an electroless nickel plating bath (E) at 90° C. for 6 minutes.

EXAMPLE 8

In a vehicle consisting of 8 parts of ABS resin, 18 parts of acetone, 23 parts of isopropyl alcohol and 20 parts of toluene were dissolved or dispersed 7 parts of $(C_3H_7COO)Ag[(C_3H_7)_2NH]$, 2 parts of $(C_2H_5COO)_2Pd [(C_6H_5)_2NH]_2$, 2 parts of copper formate, 5 parts of nickel caproate, 7 parts of aluminum stearate and 8 parts of glass enamel ($SiO_2$ 53%, $PbF_2$ 14%, $B_2O_3$ 13%, $Na_2O$ 4%, $Li_2O$ 3%, BeO 2%, $Al_2O_3$ 5%, $SnO_2$ 3% and $TiO_2$ 3%). The resultant catalyst composition was spray-coated on the whole surface of a soda lime glass sheet (50 mm $\times$ 50 mm $\times$ 5 mm) to a thickness of about 10 μm and the coat was dried at 100° C. for 10 minutes and fired at 560° C. for 12 minutes. After cooling, the glass sheet was copperplated in an electroless plating bath (F) at 250° C. for 60 minutes, washed with water and tin-plated in an electroless plating bath (G) at 55° C. for 10 minutes.

EXAMPLE 9

In a vehicle consisting of 5 parts of nitro-cellulose, 27 parts of monoethanolamine and 29 parts of monochlorobenzene were dissolved or dispersed 10 parts of $(C_7H_{15}COO)_2Pd[(C_6H_5)_2NH]_2$, 10 parts of $(C_6H_{13}COO)Ag [(C_6H_5)_2NH]$, 4 parts of zinc palmitate, 8 parts of $(C_7H_{15}COO)Sn[(C_6H_5)NH(C_3H_7)]_2$ and 7 parts of copper stearate to give a catalyst composition of this invention. Using a 270-mesh screen, the above catalyst composition was screen-printed in a 3 mm-wide square-wave linear pattern (total length 170 mm) on one side of a preliminarily sintered 96% alumina ceramic plate (100 mm×100 mm×1 mm). The plate was dried at 150° C. for 20 minutes and fired at 1500° C. for 50 minutes. After cooling the sintered body, it was immersed in 20 volume % hydrochloric acid at 30° C. for 60 seconds, washed with water and immersed in an electroless nickel plating bath (H) at 65° C. for 20 minutes. The sintered body was washed with water, immersed in 5 volume % sulfuric acid at 20° C. for 30 seconds and electrically plated in a copper electroplating bath (I) at 20° C. and at a current density of 1.5 A/dm$^2$ for 30 minutes.

REFERENCE EXAMPLE 1-A

The procedure of Example 1 was repeated except that a catalyst composition consisting of 0.2 part of palladium chloride, 50 parts of acetone and 50 parts of butyl acetate was used.

REFERENCE EXAMPLE 1-B

The procedure of Example 1 was repeated except that a catalyst composition consisting of 0.25 part of $(CH_3COO)_2Pd[(C_2H_5)_2NH]_2$, 50 parts of acetone and 50 parts of butyl acetate was used.

REFERENCE EXAMPLE 2-A

The procedure of Example 2 was repeated except that a catalyst composition consisting of 100 parts of toluene and 0.4 part of silver acetate was used.

REFERENCE EXAMPLE 2-B

The procedure of Example 2 was repeated except that a catalyst composition consisting of 100 parts of toluene and 0.4 part of $(C_2H_5COO)Ag(C_5H_5N)$ was used.

REFERENCE EXAMPLE 3-A

The procedure of Example 3 was repeated except that a dispersion of 0.5 part of palladium powder in a vehicle consisting of 15 parts of ethylcellulose and 85 parts of butylcarbitol acetate was used as the catalyst composition.

REFERENCE EXAMPLE 3-B

The procedure of Example 3 was repeated except that a catalyst composition consisting of 1 part of $(C_4H_9COO)_2Pd[(C_2H_5)_3N]_2$, 15 parts of ethylcellulose and 80 parts of butylcarbitol acetate was used.

REFERENCE EXAMPLE 4-A

The procedure of Example 4 was repeated except that a catalyst composition consisting of 0.5 part of palladium chloride, 0.5 part of silver chloride, 10 parts of polymethyl methacrylate, 40 parts of ethylcellosolve and 40 parts of ethyl acetoacetate was used.

REFERENCE EXAMPLE 4-B

The procedure of Example 4 was repeated except that a catalyst composition consisting of 0.5 part of $(CH_3COO)_2Pd[(C_6H_5)NH(C_2H_5)]_2$, 0.5 part of $(CH_3COO)Ag[(C_6H_5)_2NH]$, 10 parts of polymethyl methacrylate, 40 parts of ethylcellosolve and 40 parts of ethyl acetoacetate was used.

REFERENCE EXAMPLE 5-A

The procedure of Example 5 was repeated except that a catalyst composition consisting of 2 parts of palladium acetate, 1 part of zinc stearate, 2 parts of $(C_3H_7COO)_2Fe[(C_2H_5)_3N]_2$ and 95 parts of polyethylene glycol was used.

REFERENCE EXAMPLE 5-B

The procedure of Example 5 was repeated except that a catalyst composition consisting of 2 parts of $(C_5H_{11}COO)_2Pd[(C_3H_7)NH]_2$ and 95 parts of polyethylene glycol was used.

REFERENCE EXAMPLE 6-A

The procedure of Example 6 was repeated except that a dispersion of 7 parts of palladium powder in 93 parts of balsam oil was used as the catalyst composition.

REFERENCE EXAMPLE 6-B

The procedure of Example 6 was repeated except that a catalyst composition consisting of 90 parts of balsam oil and 10 parts of $(C_2H_5COO)_2Pd[(C_4H_9)_2NH]_2$ was used.

REFERENCE EXAMPLE 7-A

The procedure of Example 7 was repeated except that a catalyst composition consisting of 5 parts of $(CH_3COO)_2Pd[(C_2H_5)_3N]_2$, 20 parts of glass enamel, 11 parts of butylcellulose, 22 parts of methyl ethyl ketone and 26 parts of pine oil was used.

REFERENCE EXAMPLE 7-B

The procedure of Example 7 was repeated using a catalyst composition corresponding to the catalyst composition of Example 7 except that 5 parts of palladium chloride was used in lieu of 5 parts of $(CH_3COO)_2Pd[(C_2H_5)_3N]_2$.

REFERENCE EXAMPLE 8-A

The procedure of Example 8 was repeated except that a catalyst composition consisting of 7 parts of silver nitrate, 2 parts of palladium acetate, 8 parts of glass enamel, 8 parts of ABS resin, 20 parts of acetone, 25 parts of isopropyl alcohol and 30 parts of toluene was used.

REFERENCE EXAMPLE 8-B

The procedure of Example 8 was repeated except that a catalyst composition corresponding to the composition of Example 8 minus copper formate, 5 parts of nickel caproate and 7 parts of aluminum stearate was used.

REFERENCE EXAMPLE 9A

The procedure of Example 9 was repeated except that a catalyst composition corresponding to the composition of Example 9 minus 4 parts of zinc palmitate, 8 parts of $(C_7H_{15}COO)_2Sn(C_6H_5NHC_3H_7)_2$ and 7 parts of copper stearate was used.

REFERENCE EXAMPLE 9-B

The procedure of Example 9 was repeated except that a catalyst composition consisting of 10 parts of $(C_7H_{15}COO)_2Pd[(C_6H_5)_2NH]_2$, 10 parts of $(C_6H_{13}COO)Ag[(C_6H_5)_2NH]$, 8 parts of zinc palmitate, 15 parts of $(C_7H_{15}COO)_2Sn(C_6H_5NHC_3H_7)_2$, 20 parts of copper stearate, 5 parts of nitrocellulose, 20 parts of monoethanolamine and 17 parts of monochlorobenzene was used.

TABLE 1

| Plating bath composition | | Method of preparation |
|---|---|---|
| A. Nickel sulfate | 20 g | The starting materials are put in 600 ml of warm water at 60° C. and stirred to dissolve. The mixed solution is adjusted to pH 5.0 with sodium hydroxide and made up to 1 liter. |
| Citric acid | 30 g | |
| Malic acid | 30 g | |
| Sodium hypophosphite | 15 g | |
| Lead acetate | 1 mg | |
| B. Copper sulfate | 10 g | The starting materials are put in 600 ml of water and stirred to dissolve. The mixed solution is adjusted to pH 12.8 with sodium hydroxide and made up to 1 liter. |
| EDTA | 25 g | |
| 35% Formaldehyde | 15 g | |
| Sodium cyanide | 1 mg | |
| Thiourea | 0.3 mg | |
| C. Copper sulfate | 15 g | The starting materials are put in 600 ml of water and stirred to dissolve. The mixed solution is adjusted to pH 12.7 with sodium hydroxide and made up to 1 liter. |
| Potassium sodium tartrate | 15 g | |
| EDTA | 15 g | |
| 35% Formaldehyde | 20 g | |
| Potassium ferrocyanide | 70 mg | |
| D. Nickel chloride | 25 g | The starting materials are put in 600 ml of warm water at 60° C. and stirred to dissolve. The mixed solution is adjusted to pH 5.5 with sodium hydroxide and made up to 1 liter. |
| Succinic acid | 20 g | |
| Glycolic acid | 20 g | |
| Glycine | 10 g | |
| Sodium hypophosphite | 20 g | |
| Lead acetate | 2 mg | |
| E. Nickel chloride | 30 g | The starting materials are put in 600 ml of warm water at 60° C. and stirred to dissolve. The mixed solution is adjusted to pH 6.8 with sodium hydroxide and made up to 1 liter. |
| Citric acid | 40 g | |
| Ammonium chloride | 10 g | |
| Sodium hypophosphite | 35 g | |
| Sodium thiosulfate | 3 mg | |
| F. Copper sulfate | 12 g | The starting materials are put in 600 ml of water and stirred to dissolve. The mixed solution is adjusted to pH 13.0 with sodium hydroxide and made up to 1 liter. |
| Potassium sodium tartrate | 25 g | |
| 35% Formaldehyde | 30 g | |
| Diethylthiourea | 0.5 mg | |
| 2-Mercaptobenzothiazole | 0.5 mg | |
| G. Stannous sulfate | 15 g | The starting materials are put in water and stirred to dissolve. The mixed solution is made up to 1 liter. |
| Sulfuric acid | 12 g | |
| Glycolic acid | 10 g | |
| Diephenylthiourea | 2 g | |
| H. Nickel acetate | 30 g | The starting materials are put in 600 ml of water and stirred to dissolve. The mixed solution is adjusted to pH 6.5 with sodium hydroxide and made up to 1 liter |
| Citric acid | 10 g | |
| Propionic acid | 10 g | |
| Triethanolamine | 10 g | |
| Dimethylaminoborane | 7 g | |
| Lead acetate | 2.5 mg | |
| I. Copper sulfate | 100 g/l | |
| Sulfuric acid | 200 g/l | |
| Sodium chloride | 100 mg/l | |
| Gloss agent (Trademark "Rutina 81", Okuno Chemical Industries Co., Ltd.) | 3 mg/l | |

TABLE 2

| | Deposition of metal | Spread of plating[1] | Adhesion kg/mm$^2$[2] | Condition after 3 month storage[3] |
|---|---|---|---|---|
| Example 1 | 100/100 | — | 1–1.5 | No change |
| Example 2 | 100% | — | 0.8–1.2 | No change |
| Example 3 | 100% | 10–20 μm | 1.3–2.0 | No change |
| Example 4 | 100% | — | 1.0–1.4 | No change |
| Example 5 | 100% | <1 mm | 0.6–1.2 | Uniform fine powdery dispersion |
| Example 6 | 100% | <0.2 mm | 0.5–1.3 | No change |
| Example 7 | 100% | <0.1 mm | 0.7–1.5 | No change |
| Example 8 | 100% | — | 0.8–1.4 | No change |
| Example 9 | 100% | <20 μm | 1.5–2.0 | No change |
| Reference Example 1-A | 50/100 | — | 0.5–1.0 | Palladium chloride precipitated |
| Reference Example 1-B | 100/100 | — | 0.2–0.5 | No change |
| Reference Example 2-A | 80% | — | 0.4–0.8 | No change |
| Reference Example 2-B | 80% | — | 0.5–1.0 | No change |
| Reference Example 3-A | 100% | 30–80 μm | 0.2–1.2 | Palladium precipitated |
| Reference Example 3-B | 60% | 20–30 μm | 0.8–1.2 | No change |
| Reference Example 4-A | 30% | — | <0.5 | Palladium chloride and silver chloride precipitated |
| Reference Example 4-B | 40% | — | <0.5 | No change |
| Reference Example 5-A | 100% | <1 mm | <0.4 | Lumpy precipitate formed |
| Reference Example 5-B | 70% | <1 mm | <0.6 | Fine powdery dispersion |
| Reference Example 6-A | 100% | 1–2 mm | <0.5 | Palladium precipitated |
| Reference Example 6-B | 100% | 1–2 mm | 0.4–1.0 | No change |
| Reference Example 7-A | 50% | <0.1 mm | 0.3–0.8 | No change |
| Reference Example 7-B | 100% | <0.1 mm | 0.3–1.0 | Palladium chloride precipitated |
| Reference Example 8-A | 10% | — | — | Silver nitrate precipitated |
| Reference Example 8-B | 30% | — | <0.3 | No change |
| Reference Example 9-A | <10% | — | — | No change |
| Reference Example 9-B | 100% | 50–70 μm | <0.5 | No change |

Notes:
[1] Spread of plating = $\frac{\text{(Width of plated pattern)} - \text{(Pattern width of screen)}}{2}$

[2] A tinned copper wire is soldered to the plated work and pulled apart at right angles. The mean result for n = 5 is taken.

[3] The composition is prepared and stored in a sealed container at 20–25° C.

EXAMPLE 10

In a solvent mixture of 40 parts of ethyl acetate and 60 parts of ethylcellosolve were dissolved or dispersed 0.42 part of $(C_5H_{11}COO)_2[Pd(C_4H_9)_2NH]_2$ and 3.5 parts of ethyl acetoacetate-aluminum diisopropylate to give a catalyst composition of this invention. Then, 100 pieces ($3\times3\times0.5$ mm$^3$) of 96% alumina ceramic were immersed in the composition at 20° C. for 5 minutes and, then, heated at 400° C. for 6 minutes. After cooling, the alumina ceramic pieces were plated in the electroless nickel plating bath (A) at 90° C. for 15 minutes.

EXAMPLE 11

In a vehicle mixture of 30 parts of isopropyl alcohol, 30 parts of monoethanolamine and 10 parts of terpineol were dissolved or dispersed 1 part of (C$_4$H$_9$COO)Ag(C$_3$H$_7$N), 3.5 parts of (C$_{10}$H$_{21}$COO)$_2$Zn[(C$_{10}$H$_{21}$)$_2$NH]$_2$ and 2.5 parts of (C$_{15}$H$_{31}$COO)$_2$Sn[(C$_2$H$_5$)$_3$N]$_2$ to give a catalyst composition of this invention. Then, 100 pieces ($3\times3\times0.5$ mm$^3$) of zirconia ceramics were immersed in the composition at 30° C. for 10 minutes and, then, heated at 350° C. for 25 minutes. After cooling, the zirconia pieces were plated in the electroless copper plating bath (B) at 55° C. for 25 minutes.

REFERENCE EXAMPLE 10-A

The procedure of Example 10 was repeated except that a catalyst composition corresponding to the composition of Example 10 minus 3.5 parts of ethyl acetoacetate-aluminum diisopropylate was used.

REFERENCE EXAMPLE 10-B

The procedure of Example 10 was repeated using a catalyst composition corresponding to the catalyst of Example 10 except that 2 parts of aluminum chloride was used in lieu of 3.5 parts of ethyl acetoacetate-aluminum diisopropylate.

REFERENCE EXAMPLE 11-A

The procedure of Example 11 was repeated except that a catalyst composition corresponding to the composition of Example 11 minus 3.5 parts of (C$_{10}$H$_{21}$COO)$_2$Zn [(C$_{10}$H$_{21}$)$_2$NH]$_2$ and 2.5 parts of (C$_{15}$H$_{31}$COO)$_2$Sn[(C$_2$H$_5$)$_3$N]$_2$ was used.

REFERENCE EXAMPLE 11-B

The procedure of Example 11 was repeated using a catalyst composition corresponding to the catalyst composition of Example 11 except that 1.5 parts of zinc powder not more than 10 $\nu$ m in particle size and 1.5 parts of stannous oxide were used in lieu of 3.5 parts of (C$_{10}$H$_{21}$COO)$_2$Zn[(C$_{10}$H$_{21}$)$_2$NH]$_2$ and 2.5 parts of (C$_{15}$H$_{31}$COO)$_2$Sn[(C$_2$H$_5$)$_3$N].

TABLE 3

|  | Deposition of metal | Spread of plating$^{(1)}$ | Adhesion kg/mm$^2$ | Condition after 3 month storage |
|---|---|---|---|---|
| Example 10 | 100% | — | 1.4–2.4 | No change |
| Example 11 | 100% | — | 0.6–1.2 | No change |
| Reference Example 10-A | 100% | — | <0.4 | No change |
| Reference Example 10-B | 100% | — | <0.4 | Precipitate formed |

We claim:

1. A catalyst composition for forming electroless plating on ceramics which comprises:
   (i) 1 weight part of at least one member selected from the group consisting of (a) organic palladium compounds of the general formulas:

(C$_n$H$_{2n+1}$COO)$_2$Pd[(C$_{n'}$H$_{2n'+1}$)$_2$NH]$_2$, (C$_n$H$_{2n+1}$COO)$_2$Pd[(C$_{n'}$H$_{2n'+1}$)$_3$N]$_2$, (C$_n$H$_{2n+1}$COO)$_2$Pd[(C$_{n'}$H$_{2n'+1}$)NH(C$_6$H$_5$)]$_2$, (C$_n$H$_{2n+1}$COO)$_2$Pd[(C$_6$H$_5$)$_2$NH]$_2$ and (C$_n$H$_{2n+1}$COO)$_2$Pd(C$_5$H$_5$N)$_2$ wherein n and n', respectively are an integer of 1 to 7 and
   (b) organic silver compounds of the general formulas:

(C$_n$H$_{2n+1}$COO)Ag[(C$_{n'}$H$_{2n'+1}$)$_2$NH], (C$_n$H$_{2n+1}$COO)Ag[(C$_{n'}$H$_{2n'+1}$)$_3$N], (C$_n$H$_{2n+1}$COO)Ag[(C$_{n'}$H$_{2n'+1}$)NH(C$_6$H$_5$)], (C$_n$H$_{2n+1}$COO)Ag[(C$_6$H$_5$)$_2$NH] and (C$_n$H$_{2n+1}$COO)Ag(C$_5$H$_5$N)

wherein n and n', respectively, are an integer of 1 to 7,
   (ii) 0.1 to 200 weight parts of at least one member selected from the group consisting of organic metal compounds of the general formulas:

(C$_n$H$_{2n+1}$COO)$_2$M, (C$_n$H$_{2n+1}$COO)$_2$M[(C$_{n'}$H$_{2n'+1}$)$_2$NH]$_2$, (C$_n$H$_{2n+1}$COO)$_2$M[(C$_{n'}$H$_{2n'+1}$)$_3$N]$_2$, (C$_n$H$_{2n+1}$COO)$_2$M[(C$_{n'}$H$_{2n'+1}$)NH(C$_6$H$_5$)]$_2$, (C$_n$H$_{2n+1}$COO)$_2$M[(C$_6$H$_5$)$_2$NH]$_2$, (C$_n$H$_{2n+1}$COO)$_2$M(C$_5$H$_5$N)$_2$, (C$_n$H$_{2n+1}$COO)$_3$Al, (C$_{n''}$H$_{2n''+1}$O)$_3$Al and C$_6$H$_9$O$_3$Al(OC$_{n''}$H$_{2n''+1}$)$_2$ wherein n is equal to 0 or an integer of 1 to 18, n' is an integer of 1 to 18, n'' is an integer of 2 to 4, and M denotes copper, nickel, iron, aluminum, zinc or tin and
   (iii) 10 to 1000 weight parts of an organic solvent.

2. The composition of claim 1 in which the organic palladium compound is at least one compound selected from the group consisting of (CH$_3$COO)$_2$Pd[(C$_2$H$_5$)$_2$NH]$_2$, (CH$_3$COO)$_2$Pd[(C$_3$H$_7$)$_2$NH]$_2$, (CH$_3$COO)$_2$Pd[(C$_4$H$_9$)$_3$N]$_2$, (CH$_3$COO)$_2$Pd[(C$_6$H$_5$)NH(C$_2$H$_5$)]$_2$, (C$_2$H$_5$COO)$_2$Pd[(C$_2$H$_5$)$_3$N]$_2$, (C$_4$H$_9$COO)$_2$Pd(C$_5$H$_5$N)$_2$, (C$_5$H$_{11}$COO)$_2$Pd][(C$_4$H$_9$)$_2$NH]$_2$ and $(C_7H_{15}COO)_2Pd[(C_2H_5)_3N]_2$.

3. The composition of claim 1 in which the organic silver compound is at least one compound selected from the group consisting of $(CH_3COO)Ag[(C_2H_5)_2NH]$, $(CH_3COO)Ag[(C_4H_9)_2NH]$, $(CH_3COO)Ag(C_5H_5N)$, $(CH_3COO)Ag[(C_2H_5)_3N]$, $(C_2H_5COO)Ag[(C_3H_7)_2NH]$, $(C_3H_7COO)Ag[(C_4H_9)_3N]$ $(C_6H_{13}COO)Ag[(C_6H_5)NH(C_3H_7)]$ and $(C_7H_{15}COO)Ag[(C_6H_5)_2NH]$.

4. The composition of claim 1 in which the organic metal compound is at least one compound selected from the group consisting of compounds of the general formulas:

$(C_nH_{2n+1}COO)_2M$, $(C_nH_{2n+1}COO)_2M[C_2$, $(C_nH_{2n+1}COO)_2M[(C_{n'}H_{2n'+1}COO)_3N]_2$, $(C_nH_{2n+1}COO)_2M[(C_{n'}H_{2n'+1})NH(C_6H_5)]_2$, $(C_nH_{2n+1}COO)_2M[(C_6H_5)_2NH]_2$, $(C_nH_{2n+1}COO)_2M(C_5H_5N)_2$, $(C_{n''}H_{2n''+1}O)_3Al$, $C_6H_9O_3Al(OC_{n''}H_{2n''+1})_2$ and $(C_nH_{2n+1}COO)_3Al$ wherein n is equal to 0 or an integer of 1 18, n' is an integer of 1 to 18, n" is an integer of 2 to 4; M is copper, nickel, iron, aluminum, zinc or tin.

5. The composition of claim 1 in which the organic metal compound is at least one compound selected from the group consisting of $(HCOO)_2Cu[(C_2H_5)_2NH]_2$, $(C_6H_{13}COO)_2Cu[(C_6H_5)_2NH]_2$, $(CH_3COO)_2Ni[(C_3H_7)_3N]_2$, $(C_5H_{11}COO)_2Ni[(C_5H_{11})_2NH]_2$, $(C_2H_5COO)_2Fe[(C_2H_5)_3N]_2$, $(C_{12}H_{25}COO)_2Fe[(C_4H_9)_2NH]_2$, $(C_{15}H_{31}COO)_2Al[(C_3H_7)_2NH]_2$, $(C_{18}H_{37}COO)_2Al[(C_2H_5)NH(C_6H_5)]$, $(C_3H_7COO)_2Zn[(C_4H_9)_3N]_2$, $(C_{10}H_{21}COO)_2Zn[(C_7H_{15})_2NH]_2$, $(C_4H_9COO)_2Sn[(C_5H_{11})_3N]_2$, $(C_9H_{19}COO)_2Sn[(C_4H_9)NH(C_6H_5)]_2$, $(C_3H_7COO)_2Sn(C_5H_5N)_2$,
aluminum isopropylate,
aluminum butyrate,
monobutoxyaluminum diisopropylate and
ethylacetoacetate-aluminum diisopropylate.

6. A catalyst composition for forming electroless plating on ceramics which comprises:
 (i) 1 weight part of at least one member selected from the group consisting of
  (a) organic palladium compounds of the general formulas:

$(C_nH_{2n+1}COO)_2Pd[(C_{n'}H_{2n'+1})_2NH]_2$, $(C_nH_{2n+1}COO)_2Pd[(C_{n'}H_{2n'+1})_3N]_2$, $(C_nH_{2n+1}COO)_2Pd[(C_{n'}H_{2n'+1})NH(C_6H_5)]_2$, $(C_nH_{2n+1}COO)_2Pd[(C_6H_5)_2NH]_2$ and $(C_nH_{2n+1}COO)_2Pd(C_5H_5N)_2$ wherein n and n', respectively are an integer of 1 to 7 and
  (b) organic silver compounds of the general formulas:

$(C_nH_{2n+1}COO)Ag[(C_{n'}H_{2n'+1})_2NH]$, $(C_nH_{2n+1}COO)Ag[(C_{n'}H_{2n'+1})_3N]$, $(C_nH_{2n+1}COO)Ag[(C_{n'}H_{2n'+1})NH(C_6H_5)]$, $(C_nH_{2n+1}COO)Ag[(C_6H_5)_2NH]$ and $(C_nH_{2n+1}COO)Ag(C_5H_5N)$ wherein n and n', respectively, are an integer of 1 to 7,
 (ii) 0.1 to 200 weight parts of at least one member selected from the group consisting of organic metal compounds of the general formulas:

$(C_nH_{2n+1}COO)_2M$, $(C_nH_{2n+1}COO)_2M[(C_{n'}H_{2n'+1})_2NH]_2$, $(C_nH_{2n+1}COO)_2M[(C_{n'}H_{2n'+1})_3N]_2$, $(C_nH_{2n+1}COO)_2M[(C_{n'}H_{2n'+1})NH(C_6H_5)]_2$, $(C_nH_{2n+1}COO)_2M[(C_6H_5)_2NH]_2$, $(C_nH_{2n+1}COO)_2M(C_5H_5N)_2$, $(C_nH_{2n+1}COO)_3Al$, $(C_{n''}H_{2n''+1}O)_3Al$ and $C_6H_9O_3Al(OC_{n''}H_{2n''+1})_2$ wherein n is equal to 0 or an integer of 1 to 18, n' is an integer of 1 to 18, n" is an integer of 2 to 4, and M denotes copper, nickel, iron, aluminum, zinc or tin,
 (iii) 10 to 1000 weight parts of an organic solvent, and
 (iv) 1 to 500 weight parts of at least one member of the group consisting of high molecular weight organic compounds and particulate inorganic substances.

7. The composition of claim 6 in which the organic palladium compound is at least one compound selected from the group consisting of $(CH_3COO)_2Pd[(C_2H_5)_2NH]_2$, $(CH_3COO)_2Pd[(C_3H_7)_2NH]_2$ $(CH_3COO)_2Pd[(C_4H_9)_3N]_2$, $(CH_3COO)_2Pd[(C_6H_5)NH(C_2H_5)]_2$, $(C_2H_5COO)_2Pd[(C_2H_5)_3N]_2$, $(C_4H_9COO)_2Pd(C_5H_5N)_2$, $(C_5H_{11}COO)_2Pd[(C_4H_9)_2NH]_2$ and $(C_7H_{15}COO)_2Pd[(C_2H_5)_3N]_2$.

8. The composition of claim 6 in which the organic silver compound is at least one compound selected from the group consisting of $(CH_3COO)Ag[(C_2H_5)_2NH]$, $(CH_3COO)Ag[(C_4H_9)_2NH]$, $(CH_3COO)Ag(C_5H_5N)$, $(CH_3COO)Ag[(C_2H_5)_3N]$, $(C_2H_5COO)Ag[(C_3H_7)_2NH]$, $(C_3H_7COO)Ag[(C_4H_9)_3N]$ $(C_6H_{13}COO)Ag[(C_6H_5)NH(C_3H_7)]$ and $(C_7H_{15}COO)Ag[(C_6H_5)_2NH]$.

9. The composition of claim 6 in which the organic metal compound is at least one compound selected from the group consisting of compounds of the general formulas:

$(C_nH_{2n+1}COO)_2M$, $(C_nH_{2n+1}COO)_2M[(C_{n'}H_{2n'+1})_2NH]_2$, $(C_nH_{2n+1}COO)_2M[(C_{n'}H_{2n'+1}COO)_3N]_2$, $(C_nH_{2n+1}COO)_2M[(C_{n'}H_{2n'+1}NH(C_6H_5)]_2$, $(C_nH_{2n+1}COO)_2M[(C_6H_5)_2NH]_2$, $(C_nH_{2n+1}COO)_2M(C_5H_5N)_2$, $(C_{n''}H_{2n''+1}O)_3Al$, $C_6H_9O_3Al(OC_{n''}H_{2n''+1})_2$ and $(C_nH_{2n+1}COO)_3Al$ wherein n is equal to 0 or an integer of 1 to 18, n' is an integer of 1 to 18, n'' is an integer of 2 to 4; M is copper, nickel, iron, aluminum, zinc or tin.

10. The composition of claim 6 in which the organic metal compound is at least one compound selected from the group consisting of $(HCOO)_2Cu[(C_2H_5)_2NH]_2$, $(C_6H_{13}COO)_2Cu[(C_6H_5)_2NH]_2$, $(CH_3COO)_2Ni[(C_3H_7)_3N]_2$, $(C_5H_{11}COO)_2Ni[(C_5H_{11})_2NH]_2$, $(C_2H_5COO)_2Fe[(C_2H_5)_3N]_2$, $(C_{12}H_{25}COO)_2Fe[(C_4H_9)_2NH]_2$, $(C_{15}H_{31}COO)_2Al[(C_3H_7)_2NH]_2$, $(C_{18}H_{37}COO)_2Al[(C_2H_5)NH(C_6H_5)]$, $(C_3H_7COO)_2Zn[(C_4H_9)_3N]_2$, $(C_{10}H_{21}COO)_2Zn[(C_7H_{15})_2NH]_2$, $(C_4H_9COO)_2Sn[(C_5H_{11})_3N]_2$, $(C_9H_{19}COO)_2Sn[(C_4H_9NH(C_6H_5)]_2$, $(C_3H_7COO)_2Sn(C_5H_5N)_2$,
aluminum isopropylate,
aluminum butyrate,
monobutoxyaluminum diisopropylate and
ethylacetoacetate-aluminum diisopropylate.

11. The composition of claim 6 in which the high molecular weight compound is at least one thermoplastic resin selected from the group consisting of polymethyl methacrylate, polybutyl methacrylate, ethylcellulose, butylcellulose, nitrocellulose, cellulose acetate; polybutadiene, polystyrene, polyethylene, polypropylene, polyvinyl acetate, polyvinyl chloride and acrylonitrile-styrene copolymer.

12. The composition of claim 6 in which the particulate inorganic substance is at least one member selected from the group consisting of metal oxides, fluorides, silicates, carbides, nitrides and titanates.

* * * * *